United States Patent [19]

Borzym

[11] Patent Number: 5,347,901
[45] Date of Patent: Sep. 20, 1994

[54] MODULAR TUBE CUTTING APPARATUS

[76] Inventor: John J. Borzym, 4820 School Bell La., Birmingham, Mich. 48010

[21] Appl. No.: 924,185

[22] Filed: Aug. 3, 1992

[51] Int. Cl.⁵ .................... B23D 21/00; B23D 25/04
[52] U.S. Cl. ........................... 83/320; 83/859; 72/455
[58] Field of Search ............ 83/318, 320, 698, 859; 72/455; 100/214

[56] References Cited

U.S. PATENT DOCUMENTS

| | | | |
|---|---|---|---|
| 4,376,401 | 3/1983 | Borzym | 83/320 |
| 4,376,410 | 3/1983 | Wissman et al. | 72/455 |
| 4,397,232 | 8/1983 | Stockman et al. | 72/455 |
| 4,411,182 | 10/1983 | Borzym | 83/319 |
| 4,489,634 | 12/1984 | Volk | 83/828 |
| 4,542,670 | 9/1985 | Borzym | 83/320 |
| 4,614,139 | 9/1986 | Borzym | 83/320 |
| 4,947,673 | 8/1990 | Baranski | 72/455 |
| 4,964,325 | 10/1990 | Hartmann, Jr. et al. | 83/318 |

FOREIGN PATENT DOCUMENTS 506499  4/1976  U.S.S.R. ........................ 83/829

Primary Examiner—Hien H. Phan
Attorney, Agent, or Firm—Howard & Howard

[57] ABSTRACT

An inventive tube cutting apparatus includes spaced plates which allow modular mounting of the main components of the tube cutting apparatus. The various components can be replaced and matched with other components by either changing the position that the components are mounted on the plates, or replacing the plates. An accelerator utilizes an eccentric connection to a rotary motor to provide a relatively simple drive for the die set. In an alternative accelerator, a steel belt is reversibly rotated and is fixed to drive the die set. In a powerhead assembly for actuating the die set, a pair of spaced shafts are connected through two offset links to synchronize the shafts, and maintain parallelism of the ram as it is forced downwardly into the die set.

9 Claims, 13 Drawing Sheets

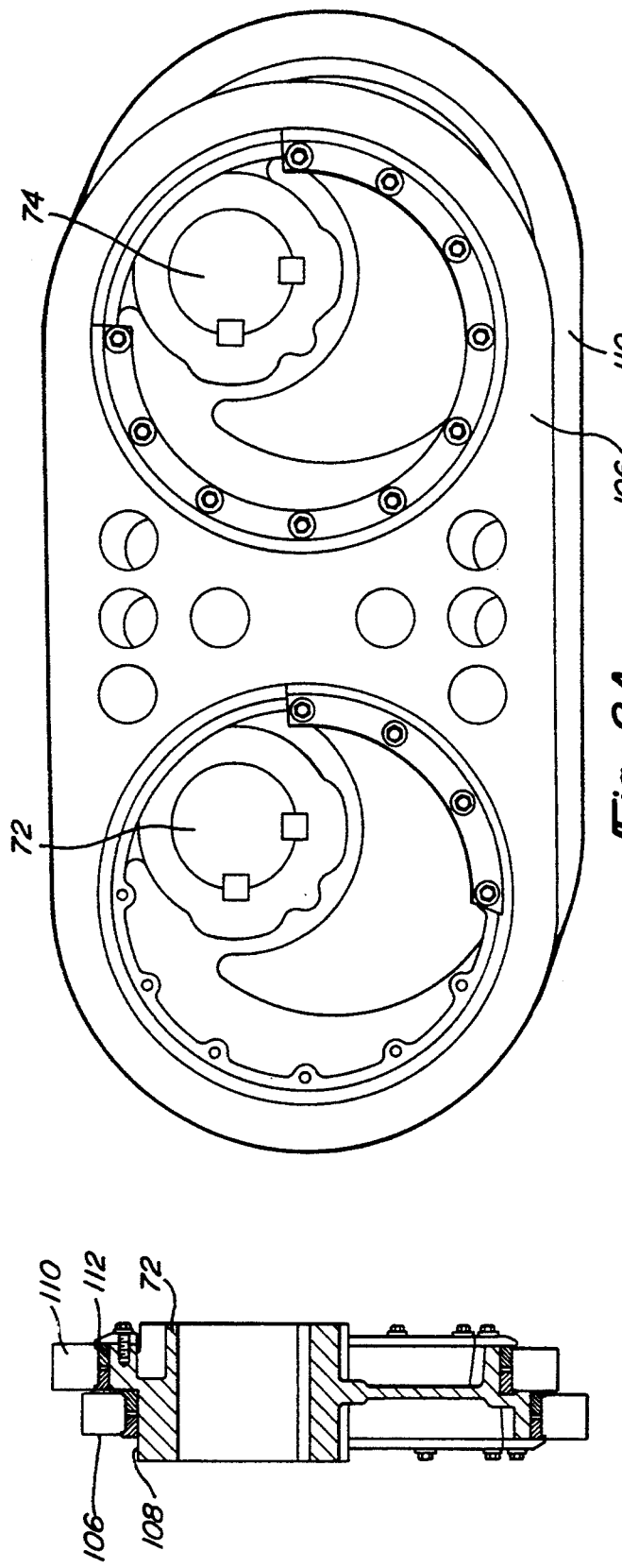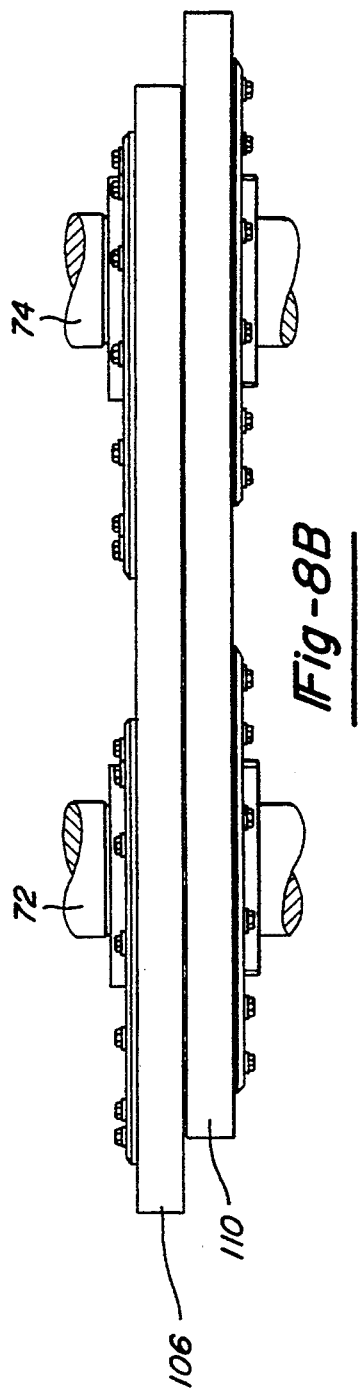

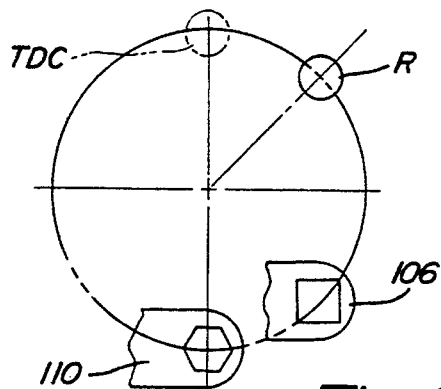
Fig-9A
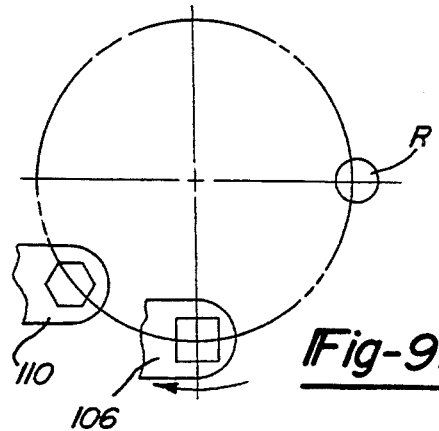
Fig-9B
Fig-9C
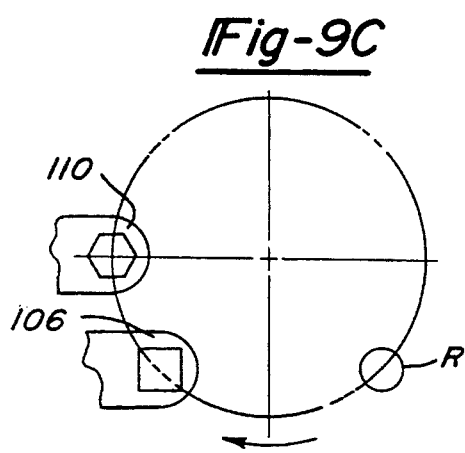
Fig-9D
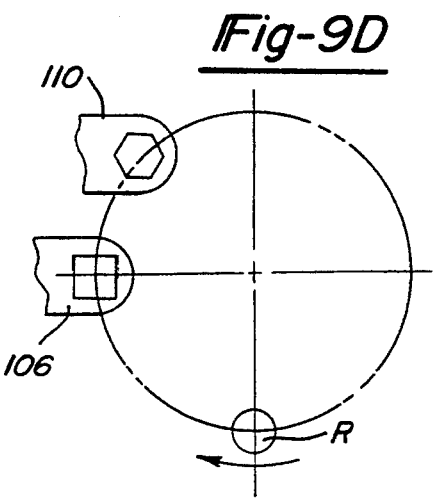
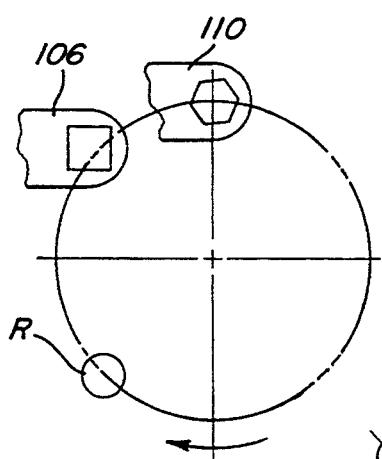
Fig-9F
Fig-9E
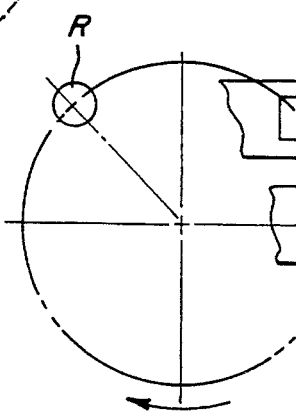
Fig-9G

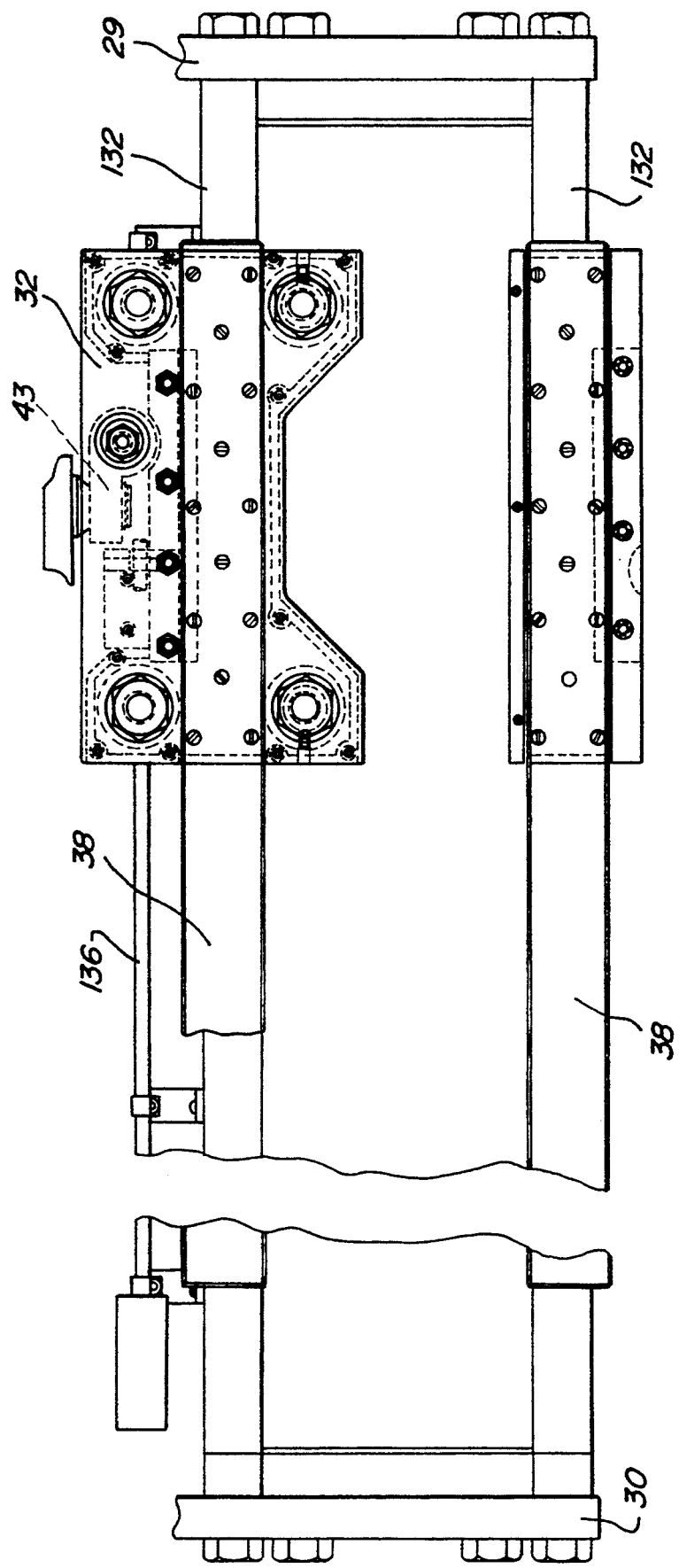

MODULAR TUBE CUTTING APPARATUS

BACKGROUND OF THE INVENTION

This application in general relates to tube cutting apparatus in which each major component may be easily replaced relative to the others. Further, improvements to the components are also disclosed.

Modern tube cutting apparatus typically include a number of separate components. First, a track bed supports a die set which typically includes a clamp and cutting blade. A drive or accelerator accelerates the die set on the bed up to the speed of a tube to be cut. A ram is forced downwardly onto the die set by a ram drive to actuate the clamp and cutting blade to cut the tube during movement of the die set. Thus, the basic components could be said to include a bed, a die set, an accelerator, a ram and a ram drive. The ram and ram drive may be collectively referred to as a powerhead. Apparatus for cutting other materials may not need each of the above components. As one example, some materials may not have needed a clamp. However, they still would require the other components.

In the prior art, these components, other than the accelerator, have all typically been permanently incorporated into a single unit. Thus, a user who wishes to change a die set to cut a larger size of tubing, has typically not been able to utilize the same bed, ram, or accelerator. The mounting for the components have typically all been welded together such that they cannot be replaced as individual units. Thus, that user has typically been required to purchase additional tube cutting apparatus for differing application.

The prior art accelerators for moving the die set had some deficiencies. It would be preferable that a simple rotating drive be utilized to accelerate the die set along its path on the bed. It has been difficult to achieve such a drive that is not undesirably large in both mass and physical size, however, and such units have not been practically developed. Further, to conserve space it would be preferred that the accelerator be positioned along the path of the die set.

The prior art powerheads also have deficiencies. In one prior art powerhead, a pair of eccentric shafts are driven to selectively drive the ram into the die set. These systems were deficient in that the mounting for the bearings of the first and second shafts were not readily accessible. Further, gear teeth on the eccentric shaft underwent large cyclic stresses, such that the large stresses were borne by certain teeth, which were prone to failure. Finally, in theory, the two shafts are always synchronized such that the ram remains parallel to the bed. In practice, due to gear tooth and bearing clearances, there is often slippage, or relative misalignment between the two shafts, such that parallelism between the shafts is lost. This is undesirable. Ideally, exact parallelism must be maintained.

SUMMARY OF THE INVENTION

In a disclosed embodiment of the present invention a pair of spaced plates mount the powerhead and the tracks. Further, an accelerator for the die set is preferably mounted between the spaced plates. The modular mounting of these various components to the spaced plates allows the various components to be easily interchanged. Thus, should one desire to change the die set, one can easily change the distance between the tracks to accommodate the new die set without the necessity of replacing the entire tube cutting apparatus. Further, the vertical and lateral position of the powerhead between the spaced plates is adjustable.

In another disclosed feature of the present invention, the accelerator for the die set may be a hypocycloidal drive. In this type of drive, a pair of equal length links are driven and connected to the die set. The die set moves through direct linear movement due to this connection. Preferably, a rotary motor for driving a first of the links is electrically controlled, and feedback of the actual die set position is given to this rotary motor. This feedback allows control of the speed of the rotary motor to control the speed and position of the die set. It is desirable for the die set to quickly reach the exact speed of the tube, such that the tube may be cut by the die set.

In another disclosed accelerator, a belt is fixed to the die set, and a reversible motor moves the belt to move the die set through its path of travel. This second disclosed accelerator also preferably uses a feedback to control its motor.

In a further disclosed feature of the present invention, a drive for a ram in the powerhead includes two spaced shafts which are connected by at least one synchronizing link. The synchronizing link is preferably offset from the eccentric mounts of the shafts to the ram. In positions where the shafts are likely to slip relative to each other, thus losing parallelism between the shafts, the link is preferably in a position where it does not allow any slippage. This maintains parallelism through the critical portions of the cyclic path of the ram. Preferably there are two links which are offset by a first angle relative to each other, with one of the links being offset by a second angle relative to the eccentric mount of the shafts to the rams.

These and other features of the present invention can be best understood from the following specification and drawings, of which the following is a brief description.

BRIEF DESCRIPTION OF THE PREFERRED EMBODIMENTS

FIG. 8A is an end view of a portion of the powerhead.

FIG. 8B is a top view of the portion shown in FIG. 8A.

FIG. 8C is a cross-sectional view through one shaft as shown in FIG. 8B.

FIG. 9A is a graphic representation of various portions of the powerhead in a first position.

FIG. 9B is a view similar to FIG. 9A, but showing a subsequent position.

FIG. 9C shows a position subsequent to that shown in FIG. 9B.

FIG. 9D shows another subsequent position.

FIG. 9E shows another subsequent position.

FIG. 9F shows yet another subsequent position.

FIG. 9G shows another subsequent position, which is then returned to the position shown in FIG. 9A.

FIG. 12 is a top view of the bed shown in FIG. 11.

DETAILED DESCRIPTION OF A PREFERRED EMBODIMENT

Figure 1:
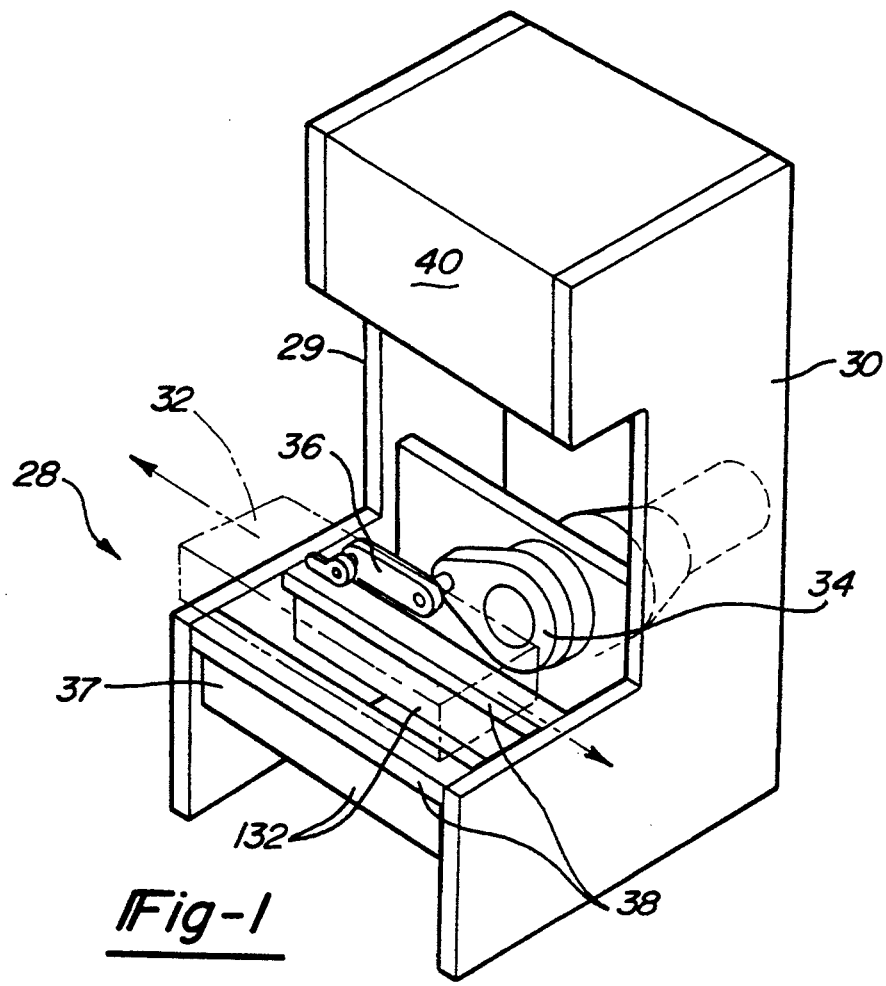
FIG. 1 is a largely schematic perspective view of a modular tube cutting apparatus.

A modular cutting system 28 is schematically illustrated in FIG. 1 and incorporates a pair of side plates 29 and 30. An accelerator 34 has a link 36 connected to drive die set 32. A track assembly 37 guidably supports die set 32 and includes two spaced tracks 38 and two track supports 132, shown schematically. A powerhead 40 has a ram which is forced downwardly into die set 32 at selected times to actuate a clamp and cutting blade to cut a workpiece. The powerhead 40, accelerator 34 and track assembly 37 are all mounted between plates 29 and 30. The device has been disclosed as a tube cutting apparatus, however, it has benefits in any cutting application.

The present invention incorporates improvements to the individual components, and is also an improvement in that each of the above individual components which are mounted to side plates 29 and 30 may be easily modified or replaced such that the various components can be utilized as modular systems. Thus, should one desire to replace die set 32 and a larger or smaller distance is necessary between the tracks 38 for the new die set, that can easily be accommodated by providing several track mounting points in the side plates 29 and 30, or by replacing only the track assembly. Similarly, the configuration or position of the powerhead may also be easily modified. The inventive system thus is an improvement over the prior art in that it is easily modified to replace the various components.

Figure 2:
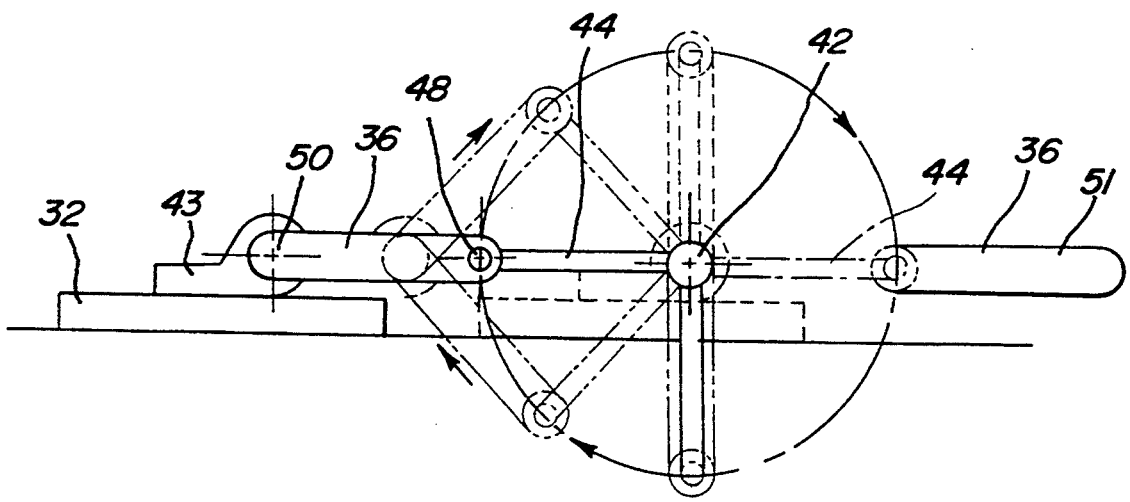
FIG. 2 is a largely schematic view of an accelerator for the inventive apparatus.

FIG. 2 shows a simplified view of accelerator with rotating member 42 which drives a first link 44. First link 44 is connected to link 36 at shaft 48, which is in turn connected at shaft 50 to a member 43 which is connected to drive die set 32 along the track assembly 37. The length of links 44 and 36 are equal.

Figure 3:
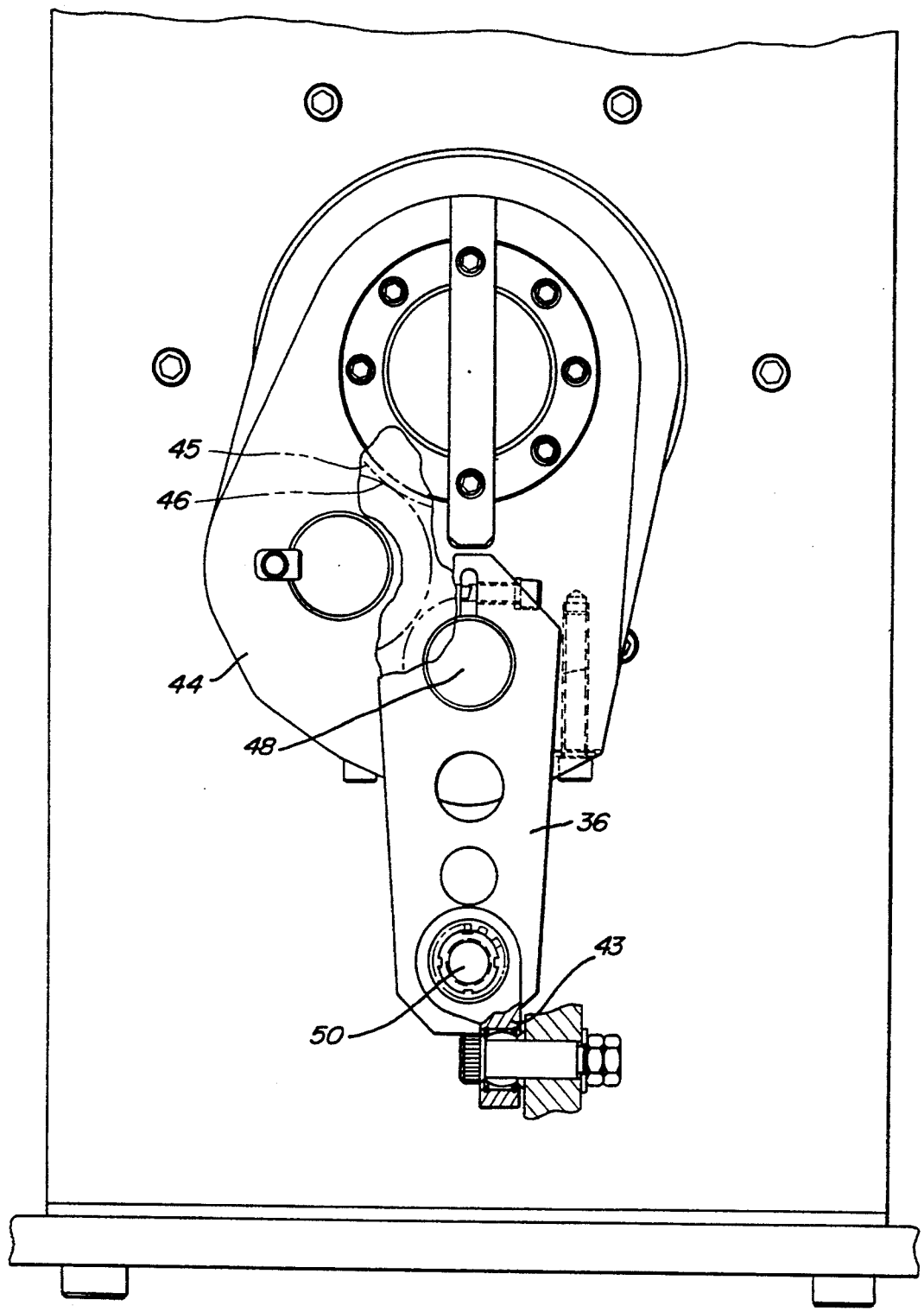
FIG. 3 is an end view of the accelerator illustrated in FIG. 2.

FIG. 3 is a graphic representation of the actual shape of the various accelerator members. As shown, member 43 is connected by shaft 50 to one end of link 36, which is in turn connected by shaft 48 to member 44. Member 44 is connected to drive shaft 42. The distance between centers of shafts 50 and 48 is equal to the distance between centers of shafts 42 and 48. Concentric with shaft 42 is a non-rotating gear 45, and integral with shaft 48 is a pinion with half the number of teeth as gear 45. Gear 45 drives pinion of shaft 48 by means of idler gear 46. With such a drive, as member 44 is rotated by shaft 42, and link 36 is caused to rotate in the opposite direction by idler 46, the position of shaft 50 moves in a straight path back through the center of shaft 42, and then forwardly to point 51. Since shaft 50 is directly connected to the die set, this translates into a direct linear movement for the die set. It is preferred that shaft 42 be driven by an electronically-controlled motor such that its speed may be instantaneously adjusted to control the speed of shaft 50. It is also preferred that feedback be associated with the track assembly 37, such that feedback signals can be sent to a motor for member 42 so that its speed can be adjusted to control the speed of point 50. Thus, a relatively simple drive is utilized to drive shaft 50 and die set 32, while at the same time ensuring that a tight control is achieved over the speed of die set 32. Further, the plural relatively small links replace the prior art slider crank configurations with relatively long links, which may flex undesirably.

Figure 4:
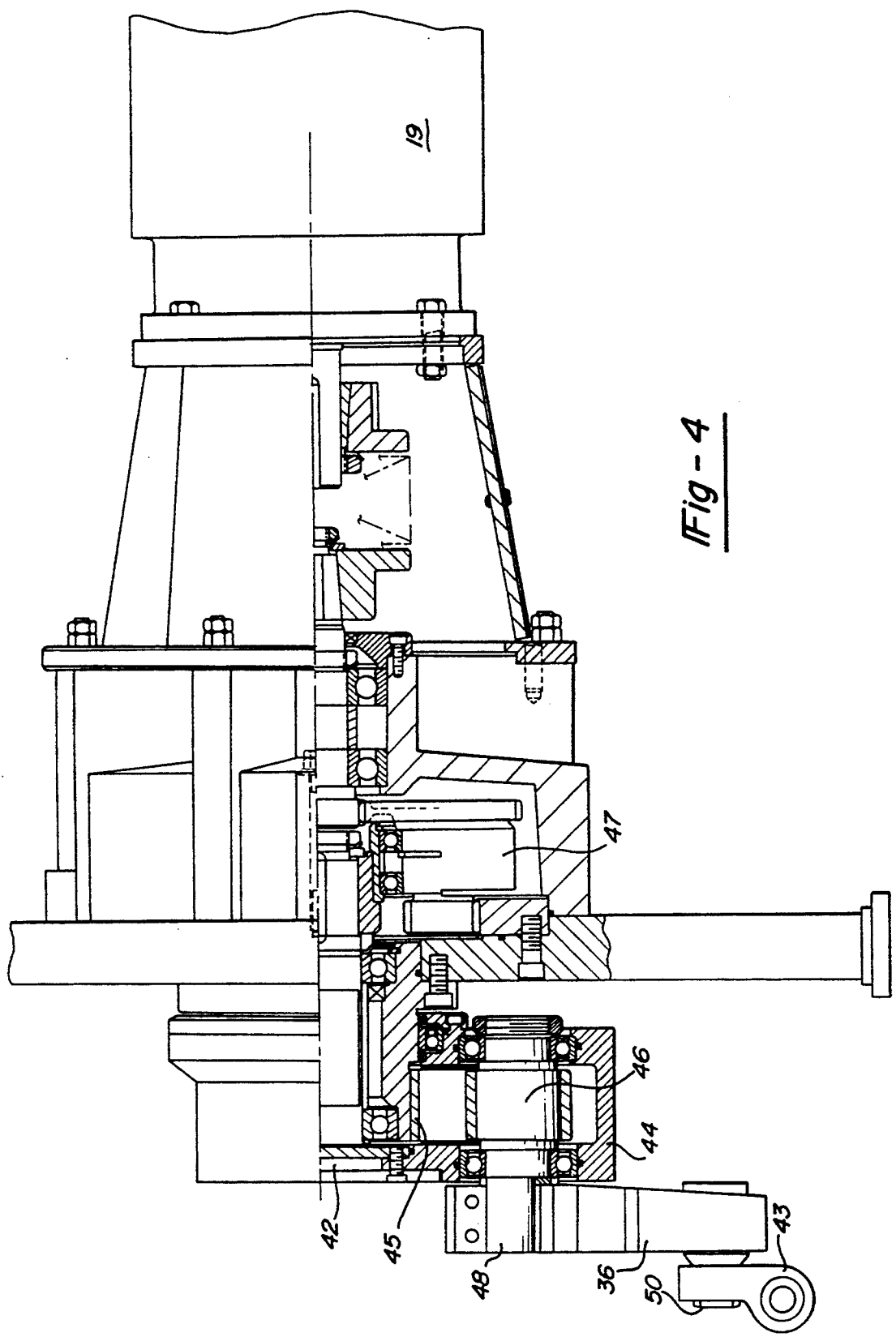
FIG. 4 is a cross-sectional view showing the accelerator.

FIG. 4 is a cross-sectional view through the overall system and shows a motor 19 for driving member 42 which drive first link 44, which hypocycloidally drives link 36, which is in turn connected to member 43, which is to be connected to the die set. A planetary gear system 47 may be inserted between motor 19 and link 44. As disclosed above, the distance between points 42 and 48 is equal to the distance between points 48 and 50. This results in point 50 having direct linear movement.

Figure 5:
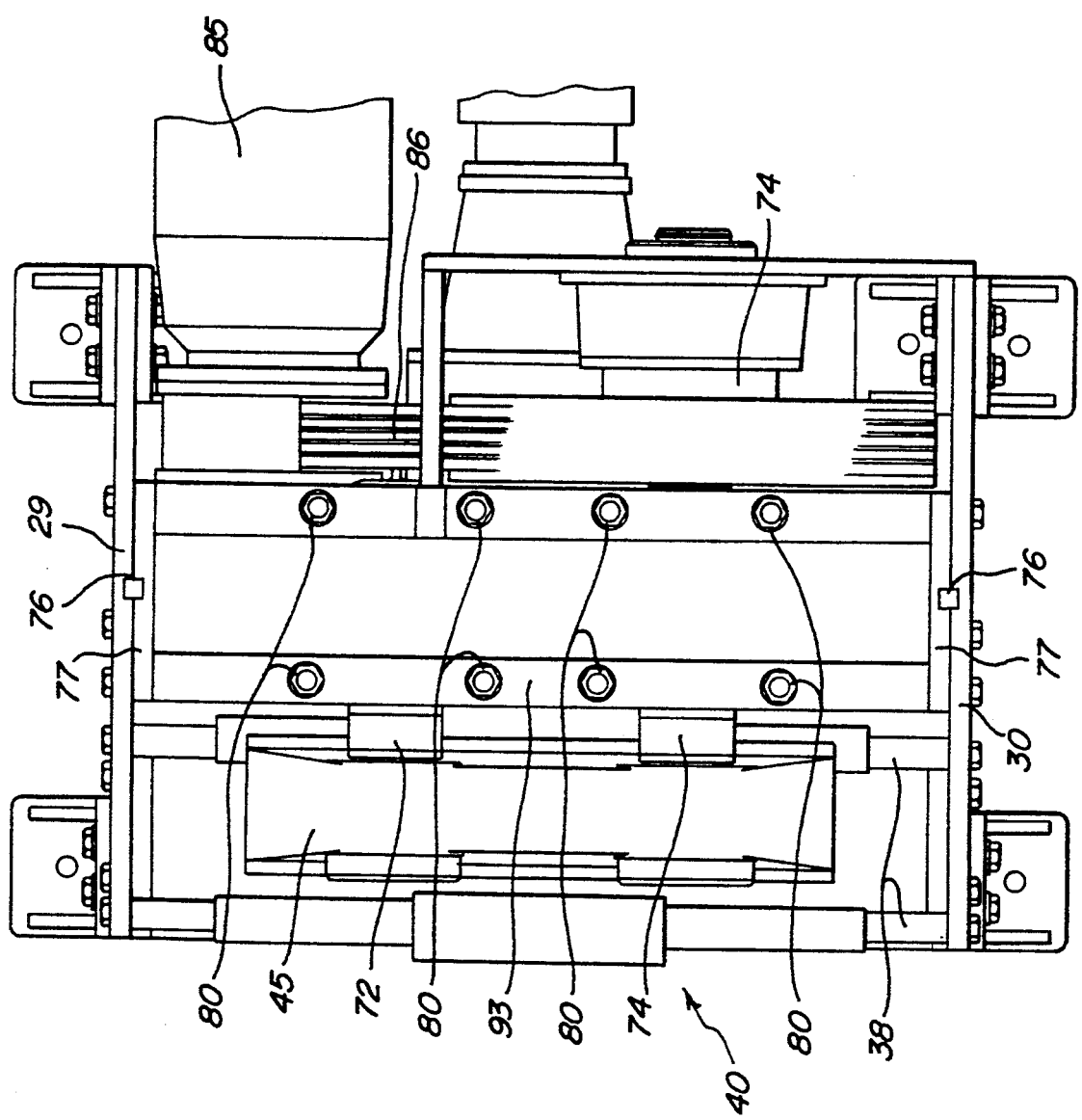
FIG. 5 is a top view showing a powerhead.

As shown in FIG. 5, powerhead 40 includes a motor 85 driving a shaft 74, which drives a follower shaft 72. A pair of keys 76 and adapter 77 secure the powerhead assembly 40 between plates 29 and 30. By replacing adapters 77 with adapters having keys at various points one can vary the position of powerhead 40 toward and away from tracks 38. Further, housing 93 is split horizontally and bolted together by bolts 80. If one desires to gain access to the interior of powerhead 40, one merely removes bolts 80 and the top half of housing 93. One would then have access to the shafts and bearings for the powerhead 40 on both shafts 72 and 74. Ram 45 is driven by shafts 72 and 74 to actuate die set 32.

Figure 6:
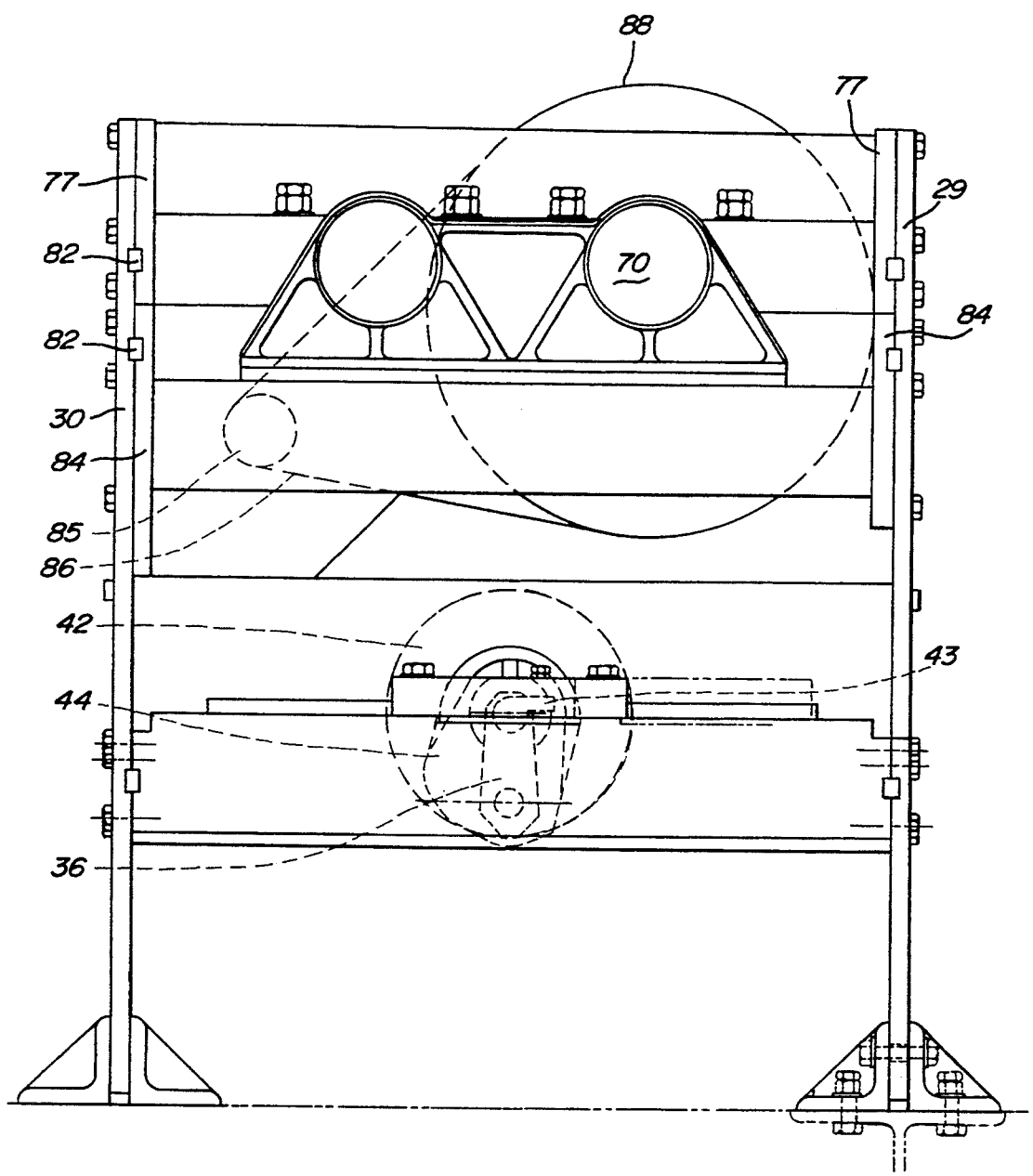
FIG. 6 is an end view showing the accelerator and the powerhead drive.

As shown in FIG. 6, rotating member 42 drives link 44, which drives link 36, which is connected to point 50. As further shown, keys 82 secure adapters 77 and lower adapters 84 to side plates 29 and 30. By changing adapters the vertical position of powerhead 40 may be easily adjusted. Further, by replacing side plates 29 and 30 the angular orientation of powerhead 40 and the die set may be varied. In this way, one can achieve a die set and powerhead which cuts at an angle relative to the vertical and horizontal. This is valuable when cutting non-cylindrical members such as square tubing. The powerhead may also be mounted beneath the die set.

Drive 85 is connected by belt 86 to a flywheel 88 which actually drives shaft 70. Shaft 70 is connected to, and may be integral with, shaft 74.

Figure 7:
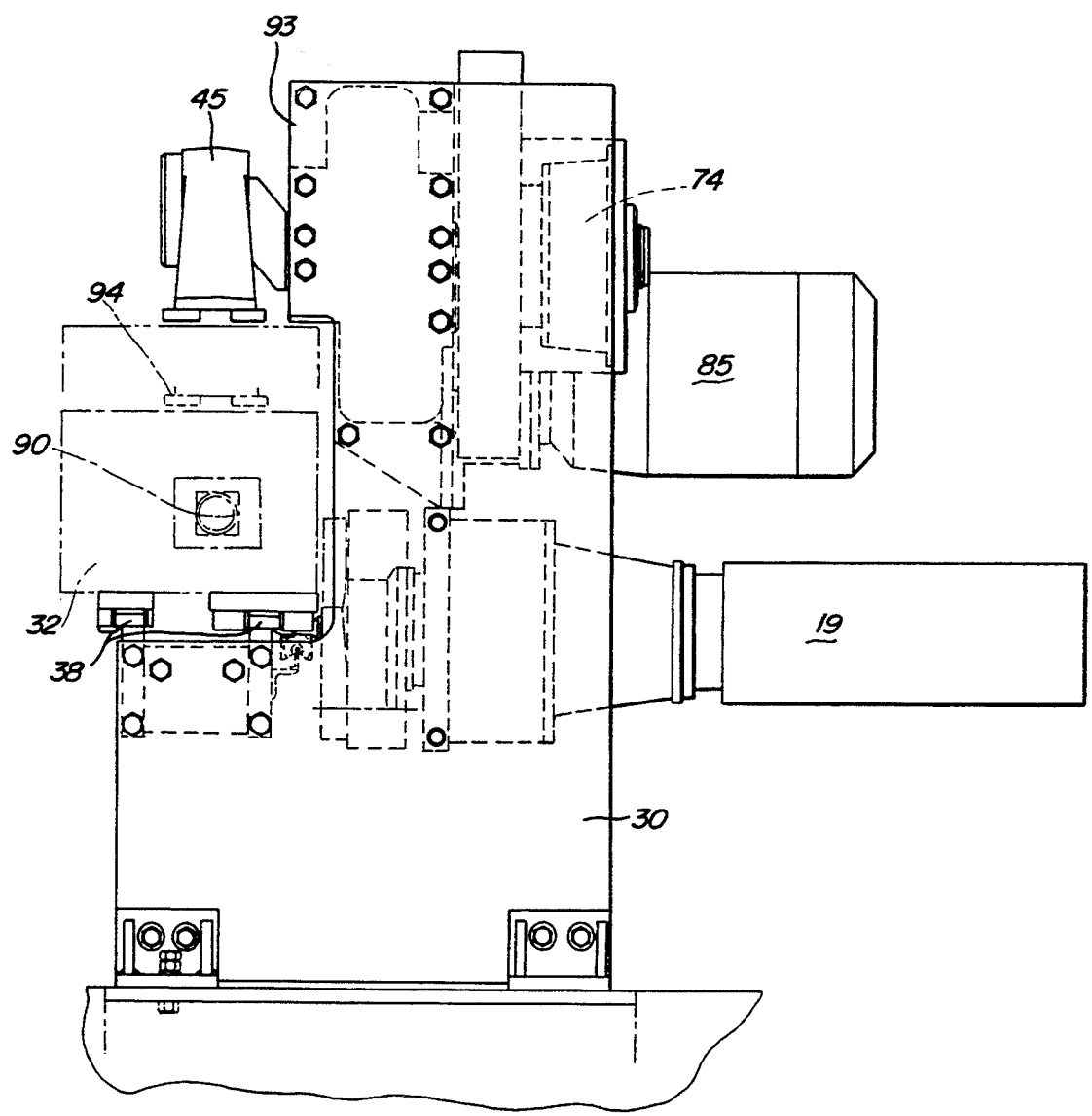
FIG. 7 is a cross-sectional view through the entire apparatus.

As shown in FIG. 7, a tube 90 is received within die set 32. A ram 45 is movable between the illustrated position and a lower position shown in phantom at 94, where it forces components of the die set 32 to clamp and cut tube 90. As further shown, die set 32 is mounted on tracks 38. Ram 45 is overhung mounted from housing 93 which is bolted to plate 30.

As shown in FIG. 8A, shafts 72 and 74 are connected by a pair of offset links 106 and 110. These links are offset by 30 degrees. As shown in FIG. 8B, shafts 72 and 74 extend through these offset links 106 and 110.

As shown in FIG. 8C, shaft 72 has a pair of eccentric mounts 108 and 112 which receive links 106 and 110, respectively. Shaft 74 has corresponding structure.

Figure 8D:
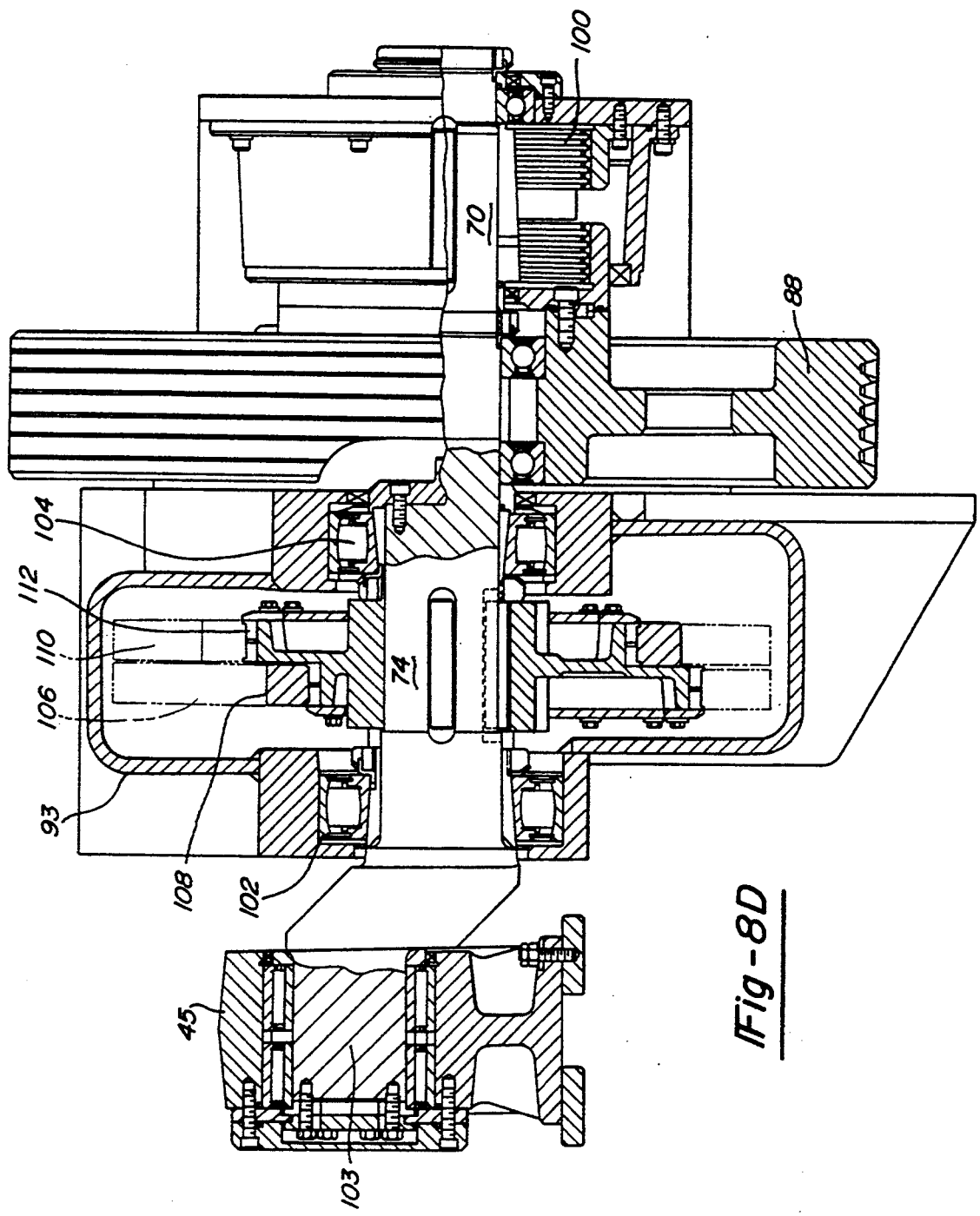
FIG. 8D is a cross-sectional view through the powerhead.

As shown in FIG. 8D, a clutch and brake combination 100 connects flywheel 88 to shaft 70. Further, taper mounted bearings 102 and 104 mount shaft 74 within housing 93. Taper mounted bearings allow bearing clearance to be adjusted to a minimum. As shown here, shafts 70 and 74 may be one integral shaft. As discussed above, when the top plate is removed, one has access to the shaft and its bearings. As also shown, ram 45 is connected to shaft 74 by eccentric 103. Shaft 72 has a similar eccentric connection to ram 45.

Prior spur gear drives were practical, but limited in achievable accuracy, durability, cycle rate and shaft center distance. As gear face width was increased to improve durability, or shaft center distance increased to accommodate a longer ram, the increased inertia reduced cycle rate. The use of links, rather than gears, to synchronize the shafts, minimizes inertia permitting higher cycle rates and increased shaft center distance.

As shown in FIG. 5, both shafts 72 and 74 drive ram 45. The shaft eccentric mount to ram 45 is angularly offset from one of the links, as an example link 106. It is shown offset by 90 degrees. Link 106 is in turn offset by an additional angle from link 110. It is shown offset by 30 degrees. The purpose of the links is to resist slippage, and maintain parallelism between ram 45 and the other components. When the eccentric mount of the shafts 72 and 74 to ram 45 is at a position where slippage may occur, preferably at least one of the links 106 and 110 is in positions which resist any slippage. This acts to maintain parallelism between the shafts.

Figure 8E:
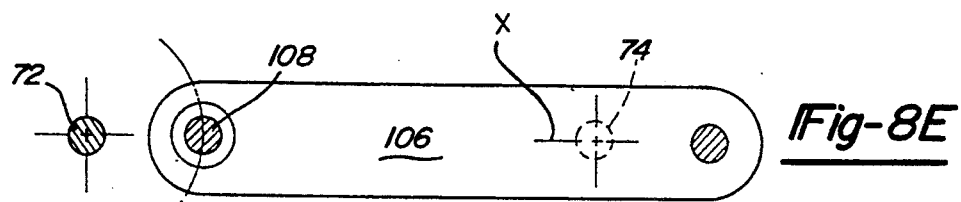
FIGS. 8E–8H show a problem in the prior art.
Figure 8F:
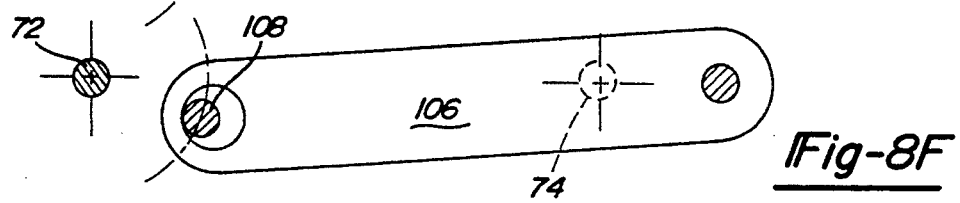
Figure 8G:
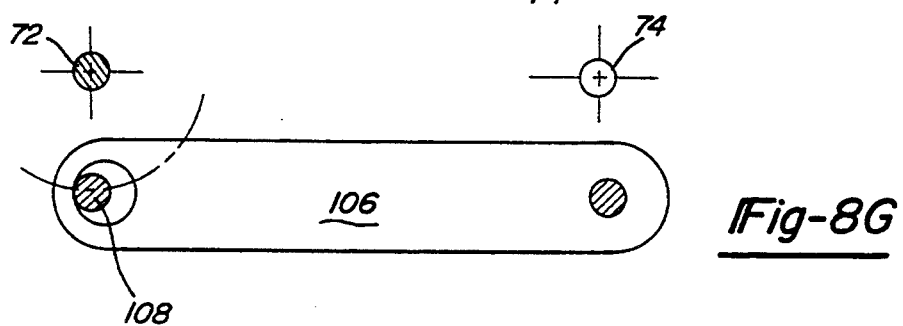
Figure 8H:
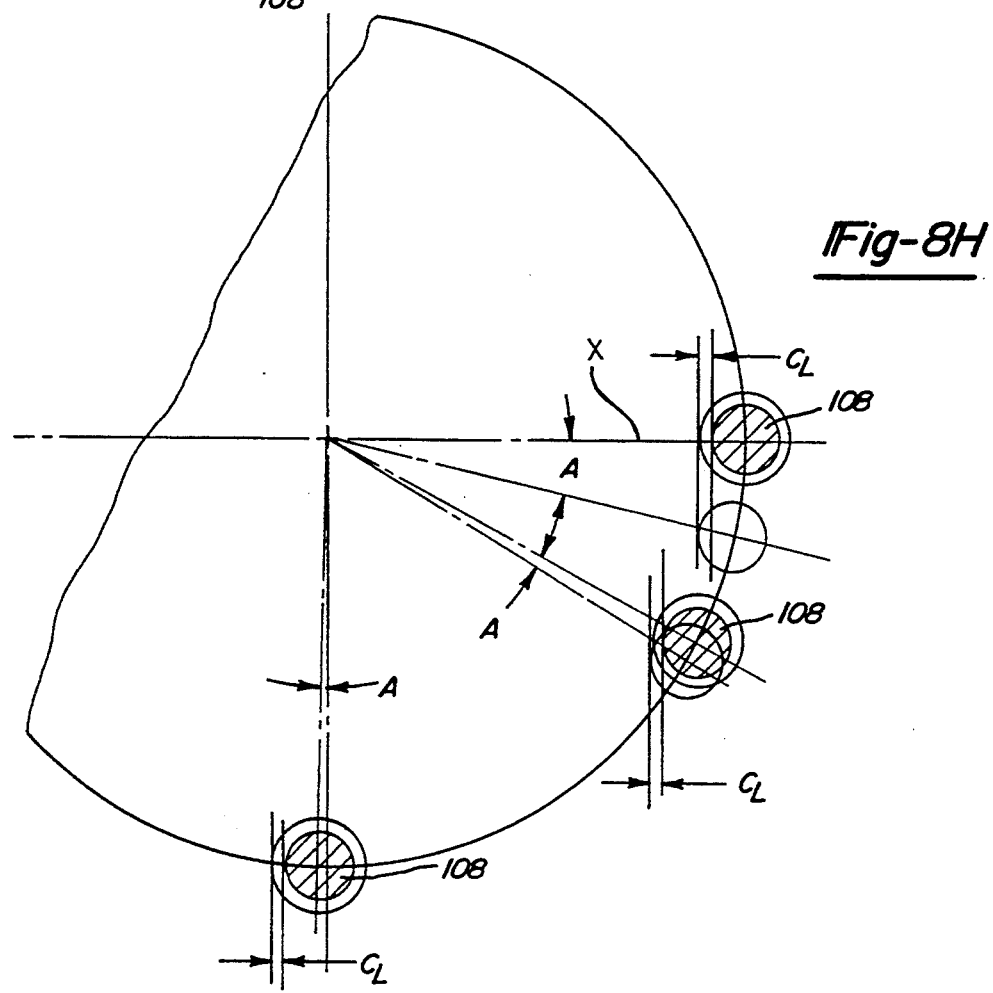

As shown in FIGS. 8E–8H, the ability of a link to resist slippage between two cranks is a function of the angle by which the link is displaced from the common centerline between points 72 and 74 of the two cranks. The larger the angle, the greater the ability of the crank to resist slippage. When the link is on the common centerline X of the two shafts, the link has a minimum ability to resist slippage. Slippage is also a function of the clearance in the attachment between the link and the crank. FIG. 8E schematically shows the link located on the common centerline X of shafts 72 and 74 and schematically shows the clearance between eccentric mount 108 on shaft 72, and link 106. Clearance between the eccentric mount 108 and link 106 is eliminated. This rotation angle is the slippage, and will increase as the clearance between the eccentric mount on shaft 74 and link 106 increases. As shown in FIG. 8G, when the link is located 90 degrees from the common centerline of shafts 72 and 74, the angle of slippage is reduced to the minimum for a specific clearance. Clearance between the eccentric mount on shaft 74 and link 106 will further increase the shown angle of slippage. FIG. 8H shows the relationship between horizontal clearance, various angular locations of the eccentric mount and slippage. Slippage can be seen to be reduced as the distance from the horizontal centerline increases.

If the ram 45 were the only connection between shafts 72 and 74, severe slippage could occur each time the ram passed through the common centerline of shafts 72 and 74. For this reason, additional links 106 and 110 are included to minimize slippage. The angular relationships between link 106 and 110 an the eccentric mount 108 for ram 45 ram are selected to minimize slippage during the load portion of the cycle and whether links 106 and 110 are to be in tension or compression.

As shown in FIG. 9A, a top dead center position TDC for the eccentric connection point of the shafts to the ram would be at twelve o'clock. This position is shown in phantom, and is merely a reference point in this figure. The connection point of the eccentric mount of the shafts to the ram is shown schematically as R. Link 106 is shown offset by 90 degrees from R. Link 110 is shown offset by an additional 30 degrees. In the position illustrated in FIG. 9A, none of the members R, 106 or 110 are in positions which typically lead to slippage. The particular position shown is a critical one during the cycle of the ram, since it is on the downstroke of the ram when the die set is being actuated to clamp and cut a tube. The largest stresses are placed on the powerhead during this portion of movement. Essentially, the most critical portions occur from the position illustrated in FIG. 9A to a position just before that shown in FIG. 9C.

As shown in FIG. 9B, the connection point R of the eccentric mount and the ram has reached the position where it is at 90 degrees from the top dead center position. This is a critical position, as slippage of the rams on the eccentric mounts is possible, and most likely at this position. However, link 106 is at the position where it is least likely to allow slippage. This is true since the link is at its lowermost position. Further, link 110 is also at a position close to that of link 106, and thus also resists slippage. At this position, links 106 and 110 ensure that the shafts 72 and 74 do not slip and maintain parallelism of the ram.

As shown in FIG. 9C, the members have passed the most critical portion of the cycle of the powerhead. The die set has been clamped and the tube has been cut. In this position link 110 is at a critical position since it may allow slippage. However, the connection point R, and link 106 are both in positions resisting slippage.

As shown in FIG. 9D, link 106 is in a position where it may allow slippage. Further, link 110 is in a position not far from link 106, and may also allow some slippage. The connection point R is in a position which is the most likely to resist slippage, however, and it is unlikely that any slippage between shafts 72 and 74 could occur. Further, this position is not a high stress position, and thus there is less likelihood of slippage.

As shown in FIG. 9E, the members have moved by an approximate additional 45 degrees. Link 110 is in a position resisting slippage and connection point link 106 is moving towards that position. The connection point R is moving towards the position where it might allow slippage in the absence of links 106 and 110.

As shown in FIG. 9F, connection point R is at a position where it may allow slippage. Link 106 is at the position where it has a great resistance to slippage, however, and link 110 is not far from that position. Thus, any slippage between shafts 72 and 74 is resisted.

FIG. 9G shows the subsequent position. Link 110 is now at a position where it may allow slippage. However, the positions of link 106 and connection point R are both close to positions where they have a great resistance to slippage. They thus tend to resist slippage between shafts 72 and 74. Further, this is not a critical or high stress portion of the cycle of the powerhead, and thus slippage is unlikely.

In summary, the shafts which drive the ram are eccentrically mounted to the ram. Further, synchronizing links connect the two shafts and are positioned offset from the eccentric mount to the ram to overcome the weak portions of the cycle of the ram drive. In this way, the inventive system allows the use of the two shaft eccentric drive for the ram, while addressing and eliminating any slippage during critical portions of the cycle.

Although the links 106 and 110 are shown in compression, they may also be in tension. Preferably, if the links are relatively short they will be utilized in compression, whereas if they are relatively long they may be utilized in tension. Further, although only two links are shown, it is envisioned that additional links could be utilized to further reduce the likelihood of any slippage between shafts 72 and 74.

Figure 10:
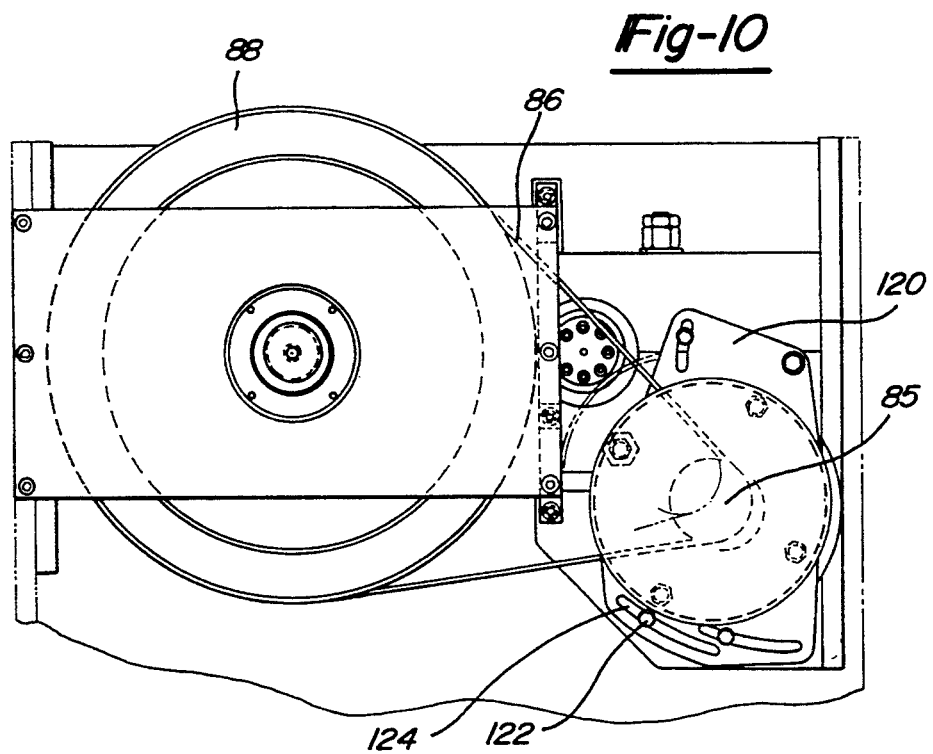
FIG. 10 is an end view of the powerhead drive.

FIG. 10 is an end view of motor 85 connected to belt 86 which in turn drives flywheel 88. As shown, motor 85 may be connected to a plate 120 which includes bolts 122 received in slots 124. Thus, the position of motor 85 may be adjusted to adjust the tension on belt 86. Further, it should be understood that motor 85 and its associated structure can be removed with the powerhead.

Figure 11:
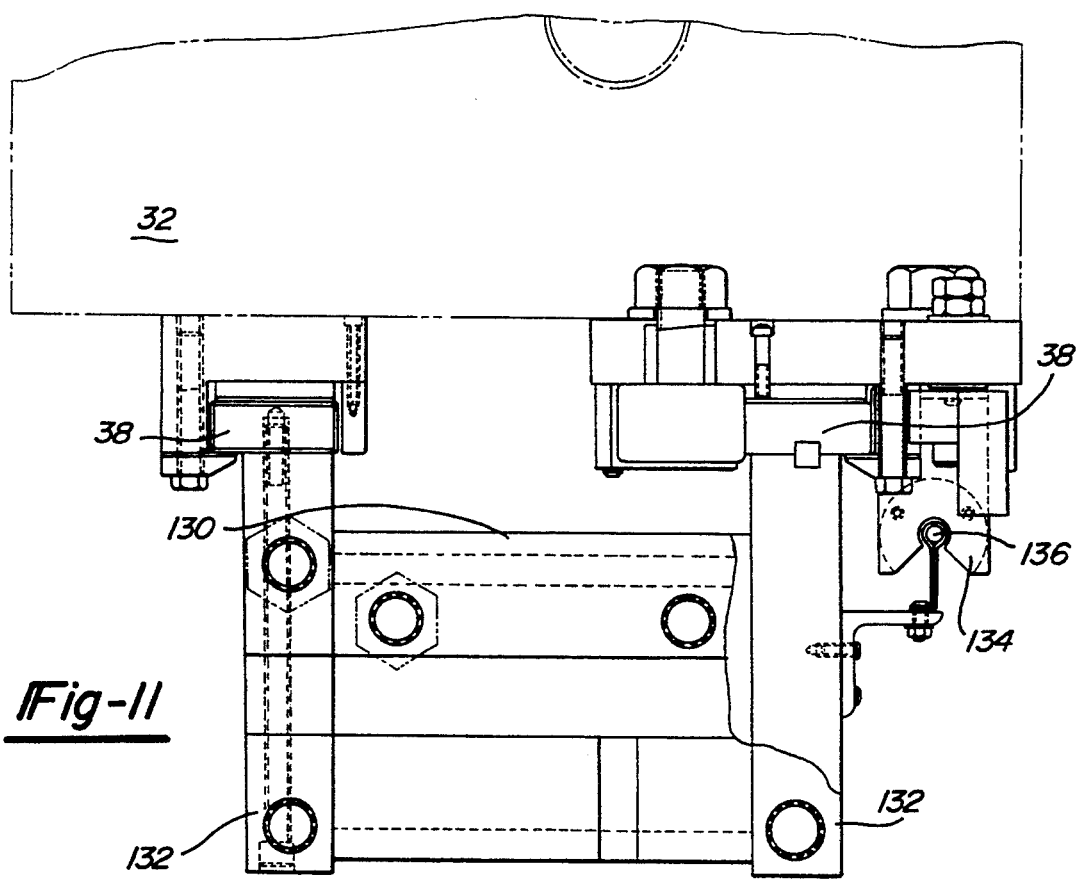
FIG. 11 is a cross-sectional view through the bed of the present invention.

As shown in FIG. 11, tracks 38 receive die set 32. Tracks 38 are mounted on track supports 132. A spacer member 130 extends between track supports 132. Supports 132 are in turn mounted to the side plates. The side plates may either have alternate bolt holes as required such that the location of tracks 38 and track supports 132 may be changed, or the track supports may be replaced entirely to change the distance between the tracks.

As also shown, member 134 is attached to die set 32 and member 136 is attached to the machine frame, here shown attached to track support 132. As die set 32 moves along tracks 38, members 134 and 136 interact to continuously provide a signal which is a function of die position to the accelerator control. By means of this signal, the accelerator controls the position and velocity of die set 32, and a relatively simple rotary motor can be used while still achieving tight control over the position and speed of the die set.

As shown in FIG. 12, tracks 38 are mounted on track supports 132 which extend between side plates 29 and 30. As further shown, member 43 is connected to die set 32, and drives it along guide tracks 38. Further, member 136 provides a feedback signal.

Figure 13:
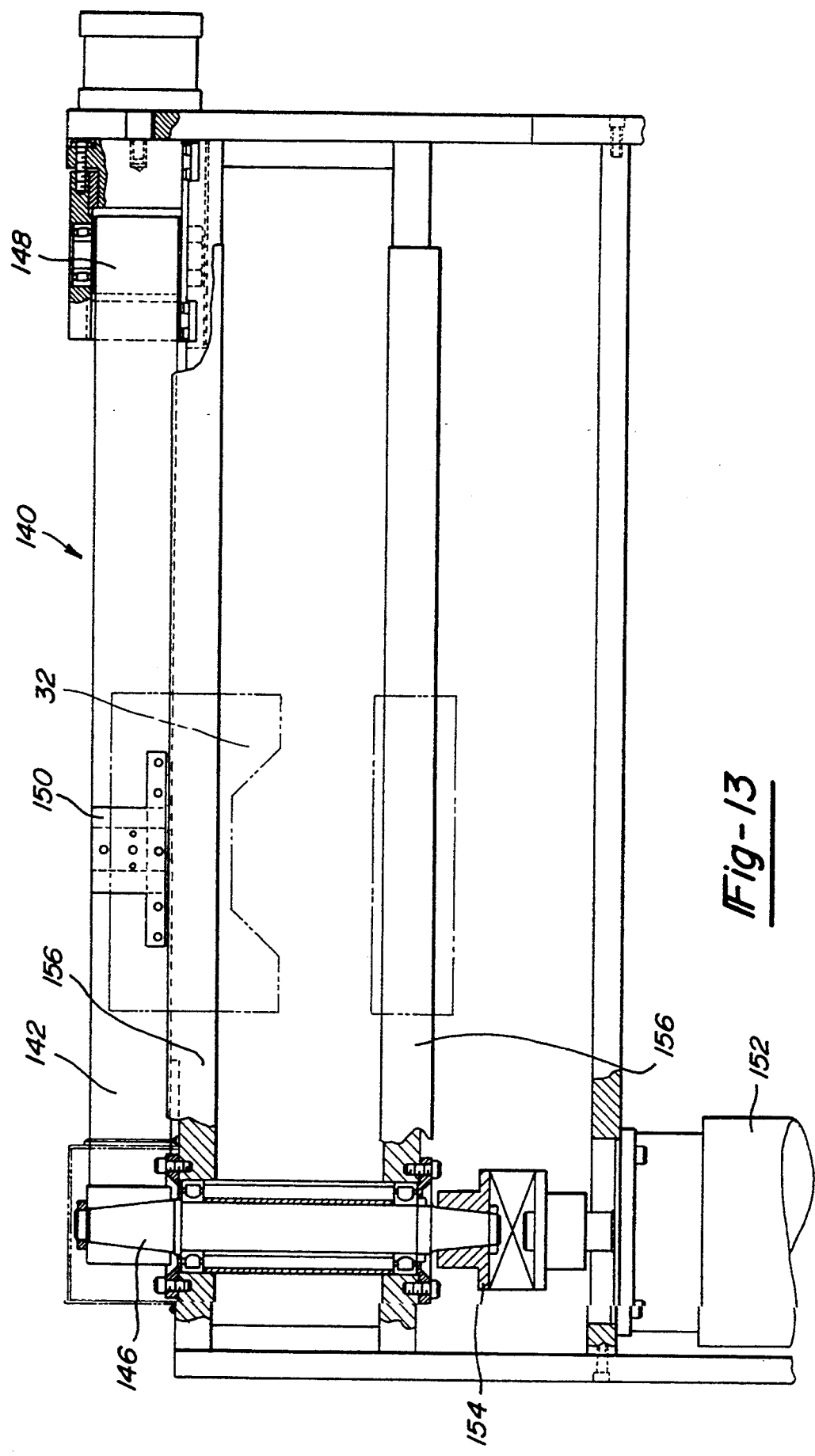
FIG. 13 is a top view similar to FIG. 12, but showing an alternative accelerator.

FIG. 13 shows an alternative accelerator 140. Accelerator 140 includes a belt 142 which is fixed to die set 32. A pair of spaced rollers 146 and 148 drive belt 142. Belt 142 is bolted at 150 to die set 32. A motor 152 drives roller 146 through a coupling 154. Tracks 156 mount die set 32. Motor 152 rotates in a first direction to move belt 142 and die set 32 moves along in that direction. At the end of the cutting operation, motor 152 is reversed, reversing the position of die set 32. Preferably, belt 142 is a steel belt. It is relatively easy to control the speed of belt 142 by this combination, and consequently to control the speed of die set 32. Further, the size of the assembly is reduced since the accelerator is incorporated into the track assembly.

In one embodiment, the motor for the accelerator is an electronically controlled motor available from Unico Corporation. Further, in one embodiment of the belt drive, a steel belt available from Belt Technologies is utilized. A feedback device available under the tradename Temposonics was preferably utilized to provide the position feedback discussed above.

Preferred embodiments of the present invention have been disclosed, however, a worker of ordinary skill in the art would recognize that certain modifications would come within the scope of this invention. For that reason the following claims should be studied in order to determine the true scope and content of this invention.

What is claimed is:

1. A modular cutting apparatus comprising:
   a pair of spaced plates;
   a bed including a pair of spaced tracks mounted between said spaced plates;
   a cutting element slidably mounted on said tracks;
   an accelerator mounted to accelerate said cutting element along said tracks;
   a powerhead mounted between said plates and selectively contacting said cutting element to actuate said cutting element; and
   wherein said spaced plates include means to mount an adaptor plate, said adaptor plates being mounted laterally between each of said spaced plates, said adaptor plates being connected to said space plates at anyone of several vertical positions, and said powerhead being mounted to said adaptor plates, such that said adaptor plates may be changed to allow the positioning of said powerhead to be adjusted both vertically, and towards and away from said tracks.

2. A modular cutting apparatus as recited in claim 1, wherein a feedback member is mounted along said bed to provide a feedback signal of the position and speed of said cutting element to said accelerator.

3. A modular cutting apparatus as recited in claim 1, wherein said accelerator includes plural links.

4. A modular cutting apparatus as recited in claim 1, wherein said drive includes a belt which is reversibly rotated to reverse the position of said cutting element on said tracks.

5. A modular cutting apparatus as recited in claim 1, wherein the distance between said tracks is adjustable by changing the mounting position of said tracks on said side plates.

6. A modular cutting apparatus as recited in claim 1, wherein the workpiece is a tube.

7. A modular cutting apparatus as recited in claim 6, wherein keys connect said adaptors to said spaced plates.

8. A modular cutting apparatus as recited in claim 1, wherein at least one key attaches said adaptor plates to said space plates at desired positions.

9. A modular cutting apparatus as recited in claim 1, wherein there being upper and lower adapter plates each being attached to said side plates, each of said upper and lower adapter plates being secured to said side plates by keys at selected positions.

* * * * *